(12) United States Patent
Hayashi

(10) Patent No.: US 11,560,458 B2
(45) Date of Patent: Jan. 24, 2023

(54) POLYAMIDE-BASED RESIN EXPANDED BEADS

(71) Applicant: JSP Corporation, Tokyo (JP)

(72) Inventor: Tatsuya Hayashi, Yokkaichi (JP)

(73) Assignee: JSP Corporation, Tokyo (JP)

( * ) Notice: Subject to any disclaimer, the term of this patent is extended or adjusted under 35 U.S.C. 154(b) by 140 days.

(21) Appl. No.: 17/171,732

(22) Filed: Feb. 9, 2021

(65) Prior Publication Data

US 2021/0253819 A1 Aug. 19, 2021

(30) Foreign Application Priority Data

Feb. 18, 2020 (JP) .............................. JP2020-025271

(51) Int. Cl.
*C08J 9/18* (2006.01)
(52) U.S. Cl.
CPC ............. *C08J 9/18* (2013.01); *C08J 2203/06* (2013.01); *C08J 2205/052* (2013.01); *C08J 2377/06* (2013.01)

(58) Field of Classification Search
CPC .... C08J 9/18; C08J 2203/06; C08J 2205/052; C08J 2377/06; C08J 9/122; C08J 9/232; C08J 2377/00; C08J 9/16; C08J 2205/044
See application file for complete search history.

(56) References Cited

U.S. PATENT DOCUMENTS

2013/0038822 A1   2/2013  Aono et al.
2018/0044497 A1*  2/2018  Kondo ..................... C08J 9/122
2021/0189089 A1   6/2021  Hayashi et al.

FOREIGN PATENT DOCUMENTS

JP      S61-268737 A    11/1986
JP      WO2011/132680 A1  10/2011
JP          6653049 B1    2/2020
WO      2016/147582 A1    9/2016

* cited by examiner

*Primary Examiner* — Kara B Boyle
(74) *Attorney, Agent, or Firm* — Fitch, Even, Tabin & Flannery LLP

(57) ABSTRACT

Polyamide-based resin expanded beads having a crystallite size of more than 8 nm as measured by X-ray diffraction method are provided.

20 Claims, No Drawings

POLYAMIDE-BASED RESIN EXPANDED BEADS

CROSS-REFERENCE TO RELATED APPLICATIONS

This application claims priority to Japanese Application No. 2020-025271, filed Feb. 18, 2020, the complete disclosure of which is incorporated by reference in its entirety herein.

FIELD OF THE INVENTION

The present invention relates to a polyamide-based resin expanded beads.

BACKGROUND OF THE INVENTION

A polyamide-based resin is known as a resin having high heat resistance, excellent in abrasion resistance and chemical resistance. An expanded molded body made by causing the polyamide-based resin to expand achieves weight saving while maintaining the excellent properties, so that use for automobile parts and the like can be expected. Accordingly, various studies on an expanded molded body of polyamide-based resin have been performed for implementation in various applications. For example, in Patent Literature 1, for the purpose of improving heat resistance and sound insulation, a polyamide-based resin expanded beads molded body having a crystallite size of 10 nm or more and a crystallinity of 10 to 50%, produced by a process including filling a mold cavity with polyamide-based resin pre-expanding beads and raising the temperature using steam in a multi-step wise manner, is disclosed.

CITATION LIST

Patent Literature

Patent Literature 1: International Publication No. WO 2016/147582

SUMMARY OF THE INVENTION

In Patent Literature 1, a polyamide-based resin expanded beads molded body excellent in heat resistance is disclosed. The expanded beads in Patent Literature 1, however, have a narrow range of in-mold formability, so that the in-mold formability is insufficient depending on the shape of a molded body, for example, in the case of having a large thickness.

Accordingly, an object of the present invention is to provide polyamide-based resin expanded beads excellent in in-mold formability.

After intensive study, the present inventors have found that the problem described above can be solved by controlling the crystallite size of polyamide-based resin expanded beads to a specific value.

In other words, the present invention provides the following [1] to [20].

[1] Polyamide-based resin expanded beads having a crystallite size of more than 8 nm as measured by X-ray diffraction method.

[2] The polyamide-based resin expanded beads according to item [1], wherein the polyamide-based resin expanded beads as a test piece has a total heat of melting of 40 to 140 J/g in a DSC curve measured when heated from 30° C. to a temperature 30° C. higher than a temperature at the end of a melting peak at a heating rate of 10° C./min based on heat-flux differential scanning calorimetry in accordance with JIS K7122-1987.

[3] The polyamide-based resin expanded beads according to item [1] or [2], wherein the polyamide-based resin expanded beads have an apparent density of 10 to 300 kg/m$^3$.

[4] The polyamide-based resin expanded beads according to any one of items [1] to [3], wherein the polyamide-based resin expanded beads has a peak top temperature of a melting peak of 185 to 285° C. in a DSC curve in a second heating obtained under the following condition 1:

Condition 1

A DSC curve measured when a polyamide-based resin expanded beads as a test piece is heated from 30° C. to a temperature 30° C. higher than a temperature at the end of a melting peak at a heating rate of 10° C./min, retained at the temperature for 10 minutes, cooled to 30° C. at a cooling rate of 10° C./min, and heated again to a temperature 30° C. higher than the temperature at the end of the melting peak at a heating rate of 10° C./min based on the heat-flux differential scanning calorimetry in accordance with JIS K7121-1987 is defined as the DSC curve in the second heating.

[5] The polyamide-based resin expanded beads according to any one of items [1] to [4], wherein the polyamide-based resin expanded beads have a crystallite size of 10 nm or more as measured by X-ray diffraction method.

[6] The polyamide-based resin expanded beads according to any one of items [1] to [5], wherein the polyamide-based resin expanded beads have a closed cell ratio of more than 90%.

[7] The polyamide-based resin expanded beads according to any one of items [1] to [6], wherein the polyamide-based resin expanded beads have an average cell size of 20 to 200 μm.

[8] The polyamide-based resin expanded beads according to any one of items [1] to [7], wherein the polyamide-based resin expanded beads have a surface layer film thickness of 5 to 50 μm.

[9] The polyamide-based resin expanded beads according to any one of items [1] to [8], wherein the polyamide-based resin expanded beads have a ratio of 5%-compressive stress at a temperature 20° C. lower than a melting point (Tm1) of the polyamide-based resin expanded beads (Tm1−20° C.) to 5%-compressive stress at 23° C. (compressive stress at 23° C.), i.e., [(Compressive stress at (Tm1−20° C.))/(Compressive stress at 23° C.)], of 0.1 or more.

[10] The polyamide-based resin expanded beads according to any one of items [1] to [9], wherein the polyamide-based resin expanded beads comprise a polyamide-based resin consisting of one or a combination of two or more selected from the group consisting of nylon 6, nylon 66, and nylon 6/66.

[11] The polyamide-based resin expanded beads according to item [10], wherein the polyamide-based resin is an end-capped polyamide-based resin with a capped functional group at a molecular chain end.

[12] The polyamide-based resin expanded beads according to item [10] or [11], wherein the polyamide-based resin has a melting point (Tm) of 180° C. or more.

[13] The polyamide-based resin expanded beads according to any one of items [10] to [12], wherein the polyamide-based resin has a density of 1.05 g/cm$^3$ or more.

[14] A polyamide-based resin expanded beads molded body prepared by in-mold molding of the polyamide-based resin expanded beads according to any one of items [1] to [13].

[15] The polyamide-based resin expanded beads molded body according to item [14], wherein the polyamide-based resin expanded beads molded body has a thickness of 30 mm or more.

[16] The polyamide-based resin expanded beads molded body according to item [14] or [15], wherein the polyamide-based resin expanded beads molded body has a closed cell ratio of 80% or more.

[17] A production method of the polyamide-based resin expanded beads according to any one of items [1] to [13], comprising a step of dispersing the polyamide-based resin beads in water in a closed vessel to obtain a dispersion, a step of impregnating the polyamide-based resin beads in the dispersion with a blowing agent, a step of retaining the dispersion at a temperature lower than a melting point of the polyamide-based resin, and a step of controlling a temperature of the dispersion immediately before expanding to a temperature lower than the melting point of the polyamide-based resin and then discharging the polyamide-based resin beads containing the blowing agent together with water from inside of the closed vessel under a pressure lower than a pressure in the closed vessel to cause expanding.

[18] A production method of the polyamide-based resin expanded beads according to any one of items [1] to [13], comprising a step of obtaining a water-containing resin beads through absorption of water into the polyamide-based resin beads, a step of impregnating the water-containing resin beads with a blowing agent in a closed vessel, and a step of heating the water-containing resin beads that contain the blowing agent to cause expanding.

[19] The production method of the polyamide-based resin expanded beads according to item [17] or [18], wherein the polyamide-based resin beads have an average mass per beads of 0.5 to 15 mg.

[20] The production method of the polyamide-based resin expanded beads according to any one of items [17] to [19], wherein the blowing agent is carbon dioxide or nitrogen.

According to the present invention, polyamide-based resin expanded beads excellent in in-mold formability can be provided.

DETAILED DESCRIPTION OF THE INVENTION

The present invention relates to polyamide-based resin expanded beads having a crystallite size of more than 8 nm as measured by X-ray diffraction method.

[Polyamide-Based Resin Expanded Beads]

<Crystallite Size of Polyamide-Based Resin Expanded Beads>

The polyamide-based resin expanded beads of the present invention have a crystallite size of more than 8 nm as measured by X-ray diffraction method. With a crystallite size of more than 8 nm, the pressure range enabling in-mold molding increases, so that excellent in-mold formability can be achieved. The crystallite size measured by X-ray diffraction method is more than 8 nm, preferably 9 nm or more, more preferably 10 nm or more, still more preferably 11 nm or more, furthermore preferably 12 nm or more. The upper limit is not limited, preferably 30 nm or less, more preferably 20 nm or less. Although the reason why excellent in-mold formability is obtained with a crystallite size of the polyamide-based resin expanded beads in the range is not clear, it is presumed that the heat resistance of the expanded beads is improved with a large crystallite size, so that a molded body can be stably formed even under various conditions, for example, at high temperature during in-mold molding and in the case of a target molded body having a large thickness. The crystallite size is measured by X-ray diffraction method, specifically by the following method. The X-ray diffraction (XRD) measurement of the polyamide-based resin expanded beads is performed by a transmission method using an X-ray scattering apparatus. The X-ray diffraction profile obtained by X-ray diffraction measurement is subjected to peak separation into diffraction peaks derived from the crystal and diffraction peaks derived from amorphous material, using a Gaussian function for the peak shapes. The full width half maximum β (rad) of a peak having the narrowest peak width among the peaks obtained by the peak separation is calculated to determine the crystallite size D of the expanded beads based on the following formula (2) using the full width half maximum β:

$$D=0.9\lambda/((\beta^2-b^2)^{1/2} \cos \theta) \tag{2}$$

wherein β represents the full width half maximum of the diffraction peak derived from crystal, b represents the full width half maximum of spread of X-ray, λ represents the wavelength of X-ray (nm), and θ represents the Bragg angle at a peak position (half of diffraction angle 2θ).

It is also preferable that the crystallite of the polyamide-based resin expanded beads having a crystallite size of more than 8 nm be made of α crystal. The crystal of α polyamide-based resin expanded beads is made of α crystal and γ crystal. The α crystal is more stable than the γ crystal, tending to have higher mechanical properties and heat resistance. It is therefore preferable that the crystallite mainly comprise α crystal, and it is more preferable that the crystallite size of α crystal be more than 8 nm. It can be determined whether the crystal is α crystal or γ crystal based on the diffraction angle (2θ) at the peak position of an X-ray diffraction profile. In the wide-angle X-ray diffraction measurement in the range of 5 to 35 degrees, the diffraction angle (2θ) at the peak position of an X-ray diffraction profile appears in the vicinity of 20 degrees and in the vicinity of 24 degrees for α crystal, and in the vicinity of 21 degrees for γ crystal.

<Fusing Characteristics of Polyamide-Based Resin Expanded Beads>

It is preferable that the polyamide-based resin expanded beads of the present invention have the following fusing characteristics. The polyamide-based resin expanded beads of the present invention as a test piece has a total heat of melting of preferably 40 to 140 J/g, more preferably 45 J/g or more, still more preferably 50 J/g or more in a DSC curve measured when heated from 30° C. to a temperature 30° C. higher than the temperature at the end of a melting peak at a heating rate of 10° C./min based on the heat-flux differential scanning calorimetry in accordance with JIS K7122-1987. Further, the total heat of melting is more preferably 120 J/g or less, still more preferably 100 J/g or less. Since the DSC curve is obtained in the first heating of the polyamide-based resin expanded beads as a test piece, the DSC curve is defined as the DSC curve in the first heating. The larger the total heat of melting in the DSC curve in the first heating is, further the crystallization of the expanded beads proceeds. The expanded beads sufficiently crystallized have more excellent heat resistance. With a total heat of melting in the DSC curve in the first heating in the above range, expanded beads more excellent in heat resistance are favorably obtained.

The total heat of melting is obtained as described below. On a resulting DSC curve, a straight line connecting a point at 150° C. on the DSC curve to a point indicating the temperature at the end of a melting peak on the DSC curve is drawn. The straight line is defined as base line. An area surrounded by the base line and the DSC curve present on the endothermic side than the base line is equivalent to the endothermic energy of a melting peak, and a quantity of heat calculated therefrom is defined as the total heat of melting. When the DSC curve has a plurality of melting peaks, a total of the whole quantity of heat is defined as the total heat of melting. The point indicating the temperature at the end of a melting peak on the DSC curve refers to a temperature at the end of a melting peak on the highest temperature side. In the present specification, a test piece left standing under an environment at a temperature of 23° C. and a relative humidity of 50% for 24 hours or more is used for the measurement of a DSC curve.

It is preferable that the polyamide-based resin expanded beads of the present invention have a peak top temperature of a melting peak in the DSC curve of 185 to 285° C. in the second heating under the following condition 1. The peak top temperature of the melting peak in the resulting DSC curve in the second heating (Hereinafter, the temperature is also referred to as the melting point of polyamide-based resin expanded beads, which is also represented by Tm1.) is equivalent to the melting point of a polyamide-based resin derived from the peculiar crystal structure inherent to the polyamide-based resin.

Condition 1

A DSC curve measured when polyamide-based resin expanded beads as a test piece is heated from 30° C. to a temperature 30° C. higher than the temperature at the end of a melting peak at a heating rate of 10° C./min, retained at the temperature for 10 minutes, cooled to 30° C. at a cooling rate of 10° C./min, and heated again to a temperature 30° C. higher than the temperature at the end of the melting peak at a heating rate of 10° C./min based on the heat-flux differential scanning calorimetry in accordance with JIS K7121-1987 is defined as the DSC curve in the second heating.

The peak top temperature of a melting peak in the DSC curve in the second heating is preferably 185 to 285° C., more preferably 188° C. or more, still more preferably 190° C. or more. On the other hand, from the viewpoint of easiness of controlling temperature at the time of expanding, the peak top temperature of a melting peak in the DSC curve in the second heating is more preferably 280° C. or less, still more preferably 260° C. or less, furthermore preferably 230° C. or less, furthermore preferably 225° C. or less. Having a melting point of the polyamide-based resin expanded beads in the above range is preferred, because not only polyamide-based resin expanded beads having a low apparent density but also polyamide-based resin expanded beads excellent in heat resistance tends to be obtained.

<Other Characteristics of Polyamide-Based Resin Expanded Beads>

It is preferable that the polyamide-based resin expanded beads of the present invention have the following characteristics other than the fusing characteristics.

It is preferable that the polyamide-based resin expanded beads of the present invention have an apparent density of 10 to 300 kg/m$^3$. The apparent density of the polyamide-based resin expanded beads of the present invention is preferably 10 kg/m$^3$ or more, more preferably 30 kg/m$^3$ or more, still more preferably 50 kg/m$^3$ or more, furthermore preferably 100 kg/m$^3$ or more. Also, the apparent density of the polyamide-based resin expanded beads is preferably 300 kg/m$^3$ or less, more preferably 250 kg/m$^3$ or less, still more preferably 200 kg/m$^3$ or less, furthermore preferably 150 kg/m$^3$ or less. With an apparent density of the expanded beads in the above range, the expanded beads and a molded body made of the expanded beads hardly shrink, so that an excellent expanded beads molded body tends to be obtained. The apparent density of a polyamide-based resin expanded beads is measured by the following method.

A measuring cylinder containing water at 23° C. is prepared. The mass W1 of expanded beads left standing under conditions at a relative humidity of 50%, a temperature of 23° C., and a pressure of 1 atm for 24 hours, having a bulk volume of about 500 cm$^3$, is measured and sunk into the water using a wire mesh in the measuring cylinder. Considering the volume of the wire mesh, the volume V1 [cm$^3$] of the expanded beads is measured based on the water level rising. The apparent density of the expanded beads is obtained by dividing the mass W1 [g] of the expanded beads by the volume V1 (W1/V1) and converting the unit into [kg/m$^3$].

The polyamide-based resin expanded beads of the present invention have a closed cell ratio of preferably 85% or more, more preferably 88% or more, still more preferably more than 90%. Having a closed cell ratio satisfying the above range, expanded beads having a low apparent density tends to be obtained. Further, the expanded beads have excellent formability, and an expanded beads molded body prepared by in-mold molding of the expanded beads haves excellent surface properties and fusion bonding properties. By using such expanded beads having a large crystallite size and a closed cell ratio in the range, a molded body excellent in in-mold formability, having a light weight, is able to be obtained. The closed cell ratio is a ratio of the volume of closed cells to the volume of the whole cells in expanded beads, which may be determined using an air pycnometer based on ASTM-D2856-70.

The average cell size of the polyamide-based resin expanded beads of the present invention is preferably 20 μm or more, more preferably 30 μm or more, still more preferably 50 μm or more. On the other hand, the average cell size of the polyamide-based resin expanded beads is preferably 200 μm or less, more preferably 150 μm or less, still more preferably 140 μm or less. The average cell size of a polyamide-based resin expanded beads is measured by the following method.

First, an expanded bead is split into about two through the center of the expanded bead, and a cross section thereof is photographed with a scanning electron microscope. Next, on the cross-sectional photograph, straight lines are drawn in 8 directions at equal intervals of 45° from near the center of the cross-section of the expanded bead to the outermost surface of the expanded bead, and the number of all the cells intersecting with the lines in total is counted. The value obtained by dividing the total length of the lines by the number of cells counted is defined as the cell size of the expanded bead. The procedure is performed in the same manner for 10 or more expanded beads, and the arithmetic means of the cell sizes of the respective expanded beads is defined as the average cell size of the expanded beads.

The surface layer film thickness of the polyamide-based resin expanded beads of the present invention is preferably 5 μm or more, more preferably 10 μm or more. Further, the surface layer film thickness of the polyamide-based resin expanded beads is more preferably 50 μm or less, still more preferably 30 μm or less. With a surface layer film thickness of a polyamide-based resin expanded beads in the range, an internal pressure is imparted to the cells during pressurization of the expanded beads, so that expanded beads which exhibit excellent surface properties in in-mold molding can be provided. Further, the expanded beads hardly cause foam breaking during in-mold molding, so that a highly expanded beads molded body tends to be obtained. Further, due to excellence in fusion bonding between expanded beads during in-mold molding, forming is achieved without an excessively high forming steam pressure. In the present invention, particularly due to the large crystallite size of the expanded beads, the expanded beads excellent in heat resistance and in-mold formability can be provided, so that a light-weight molded body excellent in heat resistance can be obtained.

The surface layer film thickness of the polyamide-based resin expanded beads may be measured by the following method. Regarding the straight lines drawn in 8 directions from near the center of the cross section of the expanded bead to the outermost surface of the expanded bead obtained in the measurement of the average cell size of the above expanded bead, the length from the outermost surface of the expanded bead to a cell positioned outermost of the expanded bead (thickness of the surface film) is measured for each. An arithmetic means of the values is taken to determine the average surface film thickness of the expanded beads.

It is preferable that the polyamide-based resin expanded beads of the present invention have a ratio of 5%-compressive stress at a temperature 20° C. lower than the melting point (Tm1) of the polyamide-based resin expanded beads (Tm1−20° C.) (compressive stress at (Tm1−20° C.)) to 5%-compressive stress at 23° C. (compressive stress at 23° C.), i.e., [(Compressive stress at (Tm1−20° C.))/(Compressive stress at 23° C.)], of 0.1 or more.

The above ratio [(Compressive stress at (Tm1−20° C.))/ (Compressive stress at 23° C.)] is more preferably 0.15 or more, still more preferably 0.2 or more. Also, the upper limit is about 1. Expanded beads having a high ratio of [(Compressive stress at (Tm1−20° C.))/(Compressive stress at 23° C.)] have only a small reduction in compressive stress at high temperature from compressive stress at normal temperature, which means that the expanded beads retain high compressive stress even at high temperature, being excellent in heat resistance. Polyamide-based resin expanded beads having a high ratio of [(Compressive stress at (Tm1−20° C.))/(Compressive stress at 23° C.)] are able to be favorably used for filler in composite forming. The temperature 20° C. lower than the melting point of the polyamide-based resin expanded beads (Tm1−20° C.) is selected for evaluation of compressive physical properties at a temperature where the crystals of the expanded beads are not melted.

The 5%-compressive stress at a temperature 20° C. lower than the melting point of polyamide-based resin expanded beads (Tm1−20° C.) may be determined by measurement of the expanded beads using a thermal analysis apparatus (TMA, for example, "TMA 7100" manufactured by Hitachi High-Tech Science Corporation) at compression mode. Specifically, one expanded bead randomly selected is held in the minor axis direction of the expanded bead under a load of 10 mN with a compression probe, and heated to a temperature 20° C. lower than the melting point of polyamide-based resin expanded beads (Tm1−20° C.). Then, while retaining the temperature 20° C. lower than the melting point of polyamide-based resin expanded beads (Tm1−20° C.), pushing at a rate of 1 mm/min is performed to monitor the load of the probe. The stress at a time when the thickness of the expanded bead reaches 5% of the thickness of the expanded bead before compression is defined as the 5%-compressive stress at (Tm1−20° C.) of the expanded bead.

The 5%-compressive stress at 23° C. may be determined in the same manner, by measurement of the expanded beads using a thermal analysis apparatus (TMA, for example, "TMA 7100" manufactured by Hitachi High-Tech Science Corporation) at compression mode. Specifically, one expanded bead randomly selected is held in the minor axis direction of the expanded bead under a load of 10 mN with a compression probe. Then, pushing at a rate of 1 mm/min is performed at 23° C. to monitor the load of the probe. The stress at a time when the thickness of the expanded bead reaches 5% of the thickness of the expanded bead before compression is defined as the 5%-compressive stress at 23° C.

<Polyamide Resin and Thermoplastic Resin Contained in Polyamide-Based Resin Expanded Beads>

The polyamide-based resin expanded beads are obtained by causing expanding of polyamide-based resin beads. Accordingly, the polyamide-based resin expanded beads contain a polyamide resin described in the following item [Polyamide-based resin]. Alternatively, the polyamide-based resin expanded beads may contain a thermoplastic resin or a thermoplastic elastomer in addition to the polyamide resin described in the following item (Polyamide-based resin beads).

The details are described as follows.

Examples of the polyamide-based resin contained in the polyamide-based resin expanded beads include a polyamide and a polyamide copolymer, and a polyamide copolymer is preferred.

Examples of the polyamide include a homopolymer such as a poly(6-aminohexanoic acid) that is also known as poly(caprolactam) (polycaproamide, nylon 6), a poly(laurolactam) (nylon 12), a poly(hexamethylene adipamide) (nylon 66), a poly(7-aminoheptanoic acid) (nylon 7), a poly(8-aminooctanoic acid) (nylon 8), a poly(9-aminononanoic acid) (nylon 9), a poly(10-aminodecanoic acid) (nylon 10), a poly(11-aminoundecanoic acid) (nylon 11), a poly(hexamethylene sebacamide) (nylon 610), a poly(decamethylene sebacamide) (nylon 1010), a poly(hexamethylene azelamide) (nylon 69), a poly(tetramethylene adipamide) (nylon 46), a poly(tetramethylene sebacamide) (nylon 410), a poly (pentamethylene adipamide) (nylon 56) and a poly(pentamethylene sebacamide) (nylon 510). The polyamide copolymer refers to a copolymer having two or more repeating units, with at least a part of the repeating units each having an amide bond. Examples of the polyamide copolymer include a caprolactam/hexamethylene diaminoadipic acid copolymer (nylon 6/66), a caprolactam/hexamethylene diaminoadipic acid/lauryllactam copolymer (nylon 6/66/12), and a caprolactam/lauryllactam copolymer (nylon 6/12). As the polyamide-based resin, the polyamides and the polyamide copolymers may be used singly or in combinations of two or more thereof. From the viewpoint of easily obtaining polyamide-based resin expanded beads having high water absorbency and a large crystallite size, among the polyamide-based resins, a polyamide-based resin made of one or two or more in combination selected from the group consisting of nylon 6, nylon 66 and nylon 6/66 is preferred, and nylon 6/66 is more preferred.

Although the polyamide copolymer may be a block copolymer including a combination of a sequence of a certain quantity of the same repeating unit of amide and a sequence of a certain quantity of a different amide, or a random copolymer including different amides each randomly repeating, a random copolymer is preferred. If the polyamide copolymer is a random copolymer, in-mold molding of the polyamide-based resin expanded beads is able to be performed under a relatively low forming steam pressure.

The melting point (Tm) of the polyamide-based resin contained in the polyamide-based resin expanded beads is preferably 180° C. or more, more preferably 185° C. or more, still more preferably 188° C. or more, furthermore preferably 190° C. or more. On the other hand, the melting point (Tm) of the polyamide-based resin is preferably 280° C. or less, more preferably 260° C. or less, still more preferably 230° C. or less, furthermore preferably 225° C. or less. From the polyamide-based resin satisfying the range of the above melting point, polyamide-based resin expanded beads having a low apparent density, excellent in heat resistance tends to be favorably obtained. When a polyamide-based resin is made of one polyamide-based resin, the melting point of polyamide-based resin refers to the melting point of the polyamide-based resin. When the polyamide-based resin is made of a mixture of two or more polyamide-based resins, or a mixture of a polyamide-based resin and another thermoplastic resin, the melting point of a polyamide-based resin refers to the melting point of the mixture kneaded with an extruder in advance.

The melting point (Tm) of the polyamide-based resin contained in a polyamide-based resin expanded beads is a value determined as the peak top temperature of a melting peak in the second DSC curve under the same condition as the above condition 1, except that after a test piece of raw material polyamide-based resin left standing under an environment at a temperature of 23° C. and a relative humidity of 50% for 24 hours, the test piece is replaced with the polyamide-based resin. When the DSC curve has a plurality of melting peaks, the peak top temperature of a melting peak having the largest area is adopted as the melting temperature.

The polyamide-based resin contained in the polyamide-based resin expanded beads has a flexural modulus of preferably 1000 MPa or more, more preferably 1200 MPa or more, still more preferably 1500 MPa or more. Having a flexural modulus in the above range, the polyamide-based resin hardly contracts even when exposed to normal temperature after expanding due to the high flexural modulus, so that a highly expanded beads tend to be favorably obtained. Also, due to the high flexural modulus, excellent in-mold formability is favorably obtained. The upper limit of the flexural modulus of the polyamide-based resin is about 3000 MPa.

The flexural modulus of a polyamide-based resin is able to be obtained by measurement in accordance with JIS K7171: 2016 after the test piece is left standing at a temperature of 23° C. and a relative humidity of 50% for 24 hours.

The polyamide-based resin contained in a polyamide-based resin expanded beads has a density of preferably 1.05 g/cm$^3$ or more, more preferably 1.1 g/cm$^3$ or more. The measurement of the density is able to be obtained based on the method described in ISO 1183-3.

It is preferable that the polyamide-based resin contained in the polyamide-based resin expanded beads be an end-capped polyamide-based resin with a capped functional group at a molecular chain end. Thereby, hydrolysis of the polyamide-based resin expanded beads in a production step is more reliably suppressed, so that a polyamide-based resin expanded beads that withstands in-mold molding tends to be obtained.

Further, the durability of polyamide-based resin expanded beads molded body obtained by in-mold molding (hereinafter, also referred to simply as "expanded beads molded body" or "molded body") is enhanced.

Examples of an end-capping agent for use in capping the above molecular chain end include a carbodiimide compound, an oxazoline compound, an isocyanate compound and an epoxy compound.

Among these, a carbodiimide compound is preferred. Specific examples thereof include an aromatic monocarbodiimide such as bis(dipropylphenyl)carbodiimide (e.g., "Stabaxol 1-LF" manufactured by Rhein Chemie Corporation), an aromatic polycarbodiimide (e.g., "Stabaxol P", "Stabaxol P100" and "Stabaxol P400" manufactured by Rhein Chemie Corporation), an aliphatic polycarbodiimide such as poly(4,4'-dicyclohexylmethane carbodiimide) (e.g., "Carbodilite LA-1" manufactured by Nisshinbo Chemical Inc.). These end-capping agents may be used singly or in combinations of two or more thereof.

The amount of the end-capping agent compounded is preferably 0.1 to 5 parts by mass, more preferably 0.3 to 3 parts by mass, relative to 100 parts by mass of a polyamide-based resin.

As described above, the polyamide-based resin for use in the present invention is preferably a polyamide-based resin with an end-capped with one or more end-capping agents selected from the group consisting of a carbodiimide compound, an epoxy compound, and an isocyanate compound, more preferably a polyamide-based resin with an end-capped with a carbodiimide compound.

The polyamide-based resin contained in polyamide-based resin expanded beads may be one alone or a mixture of two or more of the polyamide-based resins.

The polyamide resin expanded beads of the present invention may further contain another thermoplastic resin in a range without impairing the purpose and effect of the present invention, and may contain a thermoplastic elastomer as thermoplastic resin. Examples of the another thermoplastic resin and the thermoplastic elastomer include a polyethylene-based resin, a polypropylene-based resin, a polystyrene-based resin, a vinyl acetate resin, a thermoplastic polyester resin, an acrylic acid ester resin, a methacrylic acid ester resin, a rubber such as an ethylene-propylene-based rubber, an ethylene-1-butene rubber, a propylene-1-butene rubber, an ethylene-propylene-diene-based rubber, an isoprene rubber, a neoprene rubber and a nitrile rubber, a styrene-diene block copolymer and a hydrogenated styrene-diene block copolymer.

From the viewpoints of the heat resistance, the abrasion resistance and the chemical resistance, the content of the another thermoplastic resin in polyamide-based resin expanded beads is preferably 20 parts by mass or less, more preferably 15 parts by mass or less, still more preferably 10 parts by mass or less, furthermore preferably 5 parts by mass or less, relative to 100 parts by mass of the polyamide-based resin. It is furthermore preferable that the polyamide-based resin expanded beads comprises a polyamide-based resin only.

To the polyamide-based resin expanded beads, typically used various additives such as an antistatic agent, a conductivity imparting agent, a lubricant, an antioxidant, a UV absorber, a flame retardant, a metal deactivator, a colorant (pigment, dye, etc.), a crystal nucleating agent, and a filler, may be appropriately added on an as needed basis.

<Production Method of Polyamide-Based Resin Expanded Beads>

As long as the polyamide-based resin expanded beads of the present invention have a crystallite size measured by X-ray diffraction of more than 8 nm, the production method thereof is not limited. However, it is preferable that the polyamide-based resin expanded beads be produced by the following method.

It is preferable that the polyamide-based resin expanded beads of the present invention be expanded beads produced by a method including the step of enlarging the crystallite size by heating the expanded beads containing a larger amount of water than the water absorption under a normal environment. Specific examples of the method include a method including the steps of heating resin beads containing water to make resin beads having grown crystallites, impregnating the resin beads with a blowing agent, and causing expanding to make an expanded beads having grown crystallites; a method including the steps of impregnating resin beads containing water with a blowing agent, and causing expanding by heating to make expanded beads having grown crystallites; and a method including steps of allowing expanded beads to contain water and heating the water-containing beads to make expanded beads having grown crystallites.

Among them, it is preferable that the polyamide-based resin expanded beads of the present invention be obtained by the steps of allowing water-containing polyamide-based resin beads to contain a blowing agent and heating the resin beads to cause expanding, from the viewpoint of easily enlarging the crystallite size.

Examples of the method for allowing the polyamide-based resin beads or the polyamide-based resin expanded beads to contain water include a method including the step of immersing the resin beads or the expanded beads in water, a method including the step of allowing the resin beads or the expanded beads to stand still in a high-humidity atmosphere at a relative humidity of 90% or more, and a method including the step of spraying water on the resin beads or the expanded beads with a spray apparatus or the like. Among them, a method including the step of allowing the beads to contain water by immersing in water is preferred, because water is easily contained in the beads.

When the polyamide-based resin beads or the polyamide-based resin expanded beads are heated in water, the moisture content is presumed to be satisfied due to filling with water. The moisture content in the resin beads or the expanded beads is able to be determined using a Karl Fisher moisture analyzer. Specifically, the moisture content is determined by the following method.

The water on the surface of the polyamide-based resin beads or the polyamide-based resin expanded beads is wiped off with a dry cloth, then the polyamide-based resin beads or the polyamide-based resin expanded beads are weighed. Subsequently, the polyamide-based resin beads or the polyamide-based resin expanded beads are heated to vaporize internal moisture using a heating moisture vaporizer. The moisture content is measured through Karl Fischer titration (coulometric titration) using a Karl Fischer moisture analyzer.

The moisture content in the water-containing polyamide-based resin beads or polyamide-based resin expanded beads is preferably 3% or more, more preferably 5% or more, still more preferably 7% or more, particularly preferably 16% or more.

Examples of the method for heating the polyamide-based resin beads or polyamide-based resin expanded beads include a method including the steps of immersing the resin beads or the expanded beads in a medium such as water and heating the resin beads or the expanded beads by heating the medium, and a method including the step of heating the resin beads or the expanded beads by blowing hot air. Among them, a method including the step of heating in a medium such as water is preferred, as uniform heating is able to be achieved.

The heating temperature when heating the polyamide-based resin beads or polyamide-based resin expanded beads is preferably equal to or higher than a temperature 90° C. lower than the melting point (Tm) of the polyamide-based resin (Tm−90° C.), more preferably equal to or higher than (Tm−80° C.), still more preferably equal to or higher than (Tm−70° C.). On the other hand, the heating temperature is preferably equal to or lower than a temperature 20° C. higher than the melting point (Tm) of the polyamide-based resin (Tm+20° C.), more preferably equal to or lower than (Tm+10° C.), still more preferably equal to or lower than the melting temperature of the polyamide-based resin.

(Polyamide-Based Resin Beads)

The polyamide-based resin beads for use in production of the polyamide-based resin expanded beads comprise a polyamide-based resin. The polyamide-based resin may be one alone or a mixture of two or more of the polyamide-based resins.

The above polyamide-based resin beads may contain another thermoplastic resin in a range without impairing the purpose and effect of the present invention, and may contain a thermoplastic elastomer as the thermoplastic resin. Examples of the another thermoplastic resin and the thermoplastic elastomer include a polyethylene-based resin, a polypropylene-based resin, a polystyrene-based resin, a vinyl acetate resin, a thermoplastic polyester resin, an acrylic acid ester resin, a methacrylic acid ester resin, a rubber such as an ethylene-propylene-based rubber an ethylene-1-butene rubber, a propylene-1-butene rubber, an ethylene-propylene-diene-based rubber, an isoprene rubber, a neoprene rubber and a nitrile rubber, a styrene-diene block copolymer and a hydrogenated styrene-diene block copolymer.

From the viewpoints of the heat resistance, the abrasion resistance and the chemical resistance, the content of the another thermoplastic resin in polyamide-based resin beads is preferably 20 parts by mass or less, more preferably 15 parts by mass or less, still more preferably 10 parts by mass or less, furthermore preferably 5 parts by mass or less, relative to 100 parts by mass of the polyamide-based resin. It is furthermore preferable that the polyamide-based resin beads comprise a polyamide-based resin only.

To the polyamide-based resin beads, typically used various additives such as a cell controlling agent, an antistatic agent, a conductivity imparting agent, a lubricant, an antioxidant, a UV absorber, a flame retardant, a metal deactivator, a colorant (pigment, dye, etc.), a crystal nucleating agent, and a filler, may be appropriately added on an as needed basis. Examples of the cell controlling agent include an inorganic cell controlling agent such as talc, sodium chloride, calcium carbonate, silica, titanium oxide, gypsum, zeolite, borax, aluminum hydroxide, alum and carbon, and an organic cell controlling agent such as a phosphoric acid-based compound, an amine-based compound and a polytetrafluoroethylene (PTFE). Although the amount of these various additives added is different depending on the intended use of a molded body, being preferably 25 parts by mass or less relative to 100 parts by mass of polymer components of the polyamide-based resin beads. The amount is more preferably 15 parts by mass or less, still more preferably 10 parts by mass or less, furthermore preferably 5 parts by mass or less.

The average mass per polyamide-based resin bead is appropriately set depending on the size, the apparent density, etc. of the target polyamide-based resin expanded beads, being preferably 0.5 to 15 mg. With an average mass in the above range, the apparent density is able to be decreased.

From the viewpoint, the lower limit of the mass of the polyamide-based resin bead is more preferably 1.0 mg, still more preferably 1.5 mg. On the other hand, the upper limit is more preferably 10.0 mg, still more preferably 7.0 mg, furthermore preferably 5.0 mg.

The production method of the polyamide-based resin beads is not particularly limited, and a known method may be employed. The polyamide-based resin beads are obtained, for example, by a strand cutting method including the steps of feeding a polyamide-based resin and, on an as needed basis, an additive such as a cell controlling agent and colorant, into an extruder to make a molten kneaded product by kneading, extruding the molten kneaded product in a strand form from a small hole of a die attached to the tip of the extruder, and cutting the extruded strand to have a predetermined mass by a pelletizer, a hot cutting method including the step of extruding the molten kneaded product into a gas phase so as to be then immediately cut, or an underwater cutting method (UWC method) including the step of extruding the molten kneaded product into water so as to be then immediately cut.

[Polyamide-Based Resin]

Examples of the polyamide-based resin in the present specification include a polyamide and a polyamide copolymer, and a polyamide copolymer is preferred.

Examples of the polyamide include a homopolymer such as a poly(6-aminohexanoic acid) that is also known as poly(caprolactam) (polycaproamide, nylon 6), a poly(laurolactam) (nylon 12), a poly(hexamethylene adipamide) (nylon 66), a poly(7-aminoheptanoic acid) (nylon 7), a poly(8-aminooctanoic acid) (nylon 8), a poly(9-aminononanoic acid) (nylon 9), a poly(10-aminodecanoic acid) (nylon 10), a poly(11-aminoundecanoic acid) (nylon 11), a poly(hexamethylene sebacamide) (nylon 610), a poly(decamethylene sebacamide) (nylon 1010), a poly(hexamethylene azelamide) (nylon 69), a poly(tetramethylene adipamide) (nylon 46), a poly(tetramethylene sebacamide) (nylon 410), a poly(pentamethylene adipamide) (nylon 56) and a poly(pentamethylene sebacamide) (nylon 510). The polyamide copolymer refers to a copolymer having two or more repeating units, with at least a part of the repeating units each having an amide bond. Examples of the polyamide copolymer include a caprolactam/hexamethylene diaminoadipic acid copolymer (nylon 6/66), a caprolactam/hexamethylene diaminoadipic acid/lauryllactam copolymer (nylon 6/66/12), and a caprolactam/lauryllactam copolymer (nylon 6/12). As the polyamide-based resin, the polyamides and the polyamide copolymers may be used singly or in combinations of two or more thereof. From the viewpoint of easily obtaining polyamide-based resin expanded beads having high water absorbency and a large crystallite size, among the polyamide-based resins, a polyamide-based resin made of one or two or more in combination of selected from the group consisting of nylon 6, nylon 66 and nylon 6/66 is preferred, and nylon 6/66 is more preferred.

Although the polyamide copolymer may be a block copolymer including a combination of a sequence of a certain quantity of the same repeating unit of amide and a sequence of a certain quantity of a different amide, or a random copolymer including different amides each randomly repeating, a random copolymer is preferred. If the polyamide copolymer is a random copolymer, in-mold molding of the polyamide-based resin expanded beads is able to be performed under a relatively low forming steam pressure.

The melting point (Tm) of the polyamide-based resin is preferably 180° C. or more, more preferably 185° C. or more, still more preferably 188° C. or more, furthermore preferably 190° C. or more. On the other hand, the melting point (Tm) of the polyamide-based resin is preferably 280° C. or less, more preferably 260° C. or less, still more preferably 230° C. or less, furthermore preferably 225° C. or less. From the polyamide-based resin satisfying the above range of the melting point, polyamide-based resin expanded beads having a low apparent density, excellent in heat resistance tends to be favorably obtained. When a polyamide-based resin is made of one polyamide-based resin, the melting point of a polyamide-based resin refers to the melting point of the polyamide-based resin. When the polyamide-based resin is made of a mixture of two or more polyamide-based resins, or a mixture of a polyamide-based resin and another thermoplastic resin, the melting point of a polyamide-based resin refers to the melting point of the mixture kneaded with an extruder in advance.

The melting point (Tm) of the polyamide-based resin is a value determined as the peak top temperature of a melting peak in the second DSC curve under the same condition as the condition 1, except that after a test piece of raw material polyamide-based resin left standing under an environment at a temperature of 23° C. and a relative humidity of 50% for 24 hours, the test piece is replaced with the polyamide-based resin. When the DSC curve has a plurality of melting peaks, the peak top temperature of a melting peak having the largest area is adopted as the melting temperature.

The polyamide-based resin in the present specification has a flexural modulus of preferably 1000 MPa or more, more preferably 1200 MPa or more, still more preferably 1500 MPa or more. Having a flexural modulus in the above range, the polyamide-based resin hardly contracts even when exposed to normal temperature after expanding due to the high flexural modulus, so that highly expanded beads tend to be favorably obtained. Also, due to the high flexural modulus, excellent in-mold formability is favorably obtained. The upper limit of the flexural modulus of the polyamide-based resin is about 3000 MPa.

The flexural modulus of a polyamide-based resin is able to be obtained by measurement in accordance with JIS K7171: 2016 after the test piece is left standing at a temperature of 23° C. and a relative humidity of 50% for 24 hours.

The polyamide-based resin in the present specification has a density of preferably 1.05 g/cm$^3$ or more, more preferably 1.1 g/cm$^3$ or more. The measurement of the density is able to be performed based on the method described in ISO 1183-3.

It is preferable that the polyamide-based resin for use in the present invention be an end-capped polyamide-based resin with a capped functional group at a molecular chain end. Thereby, hydrolysis of the polyamide-based resin expanded beads in a production step is more reliably suppressed, so that polyamide-based resin expanded beads that withstand in-mold molding tends to be obtained.

Further, the durability of polyamide-based resin expanded beads molded body obtained by in-mold molding (hereinafter, also referred to simply as "expanded beads molded body" or "molded body") is enhanced.

Examples of an end-capping agent for capping the above molecular chain end include a carbodiimide compound, an oxazoline compound, an isocyanate compound and an epoxy compound.

Among these, a carbodiimide compound is preferred. Specific examples thereof include an aromatic monocarbodiimide such as bis(dipropylphenyl)carbodiimide (e.g., "Stabaxol 1-LF" manufactured by Rhein Chemie Corporation), an aromatic polycarbodiimide (e.g., "Stabaxol P", "Stabaxol P100" and "Stabaxol P400" manufactured by Rhein Chemie Corporation), and an aliphatic polycarbodiimide such as poly(4,4'-dicyclohexylmethane carbodiimide) (e.g., "Carbodilite LA-1" manufactured by Nisshinbo Chemical Inc.). These end-capping agents may be used singly or in combinations of two or more thereof.

The amount of the end-capping agent compounded is preferably 0.1 to 5 parts by mass, more preferably 0.3 to 3 parts by mass, relative to 100 parts by mass of a polyamide-based resin.

As described above, the polyamide-based resin for use in the present invention is preferably a polyamide-based resin with an end-capped with one or more end-capping agents selected from the group consisting of a carbodiimide compound, an epoxy compound, and an isocyanate compound, more preferably a polyamide-based resin with an end-capped with a carbodiimide compound.

It is preferable that the polyamide-based resin expanded beads of the present invention be obtained by a method including the step of heating water-containing polyamide-based resin beads to cause expanding, or produced by the following method 1 or 2.

A method 1 comprises a step of obtaining a dispersion by dispersing the polyamide-based resin beads in water in a closed vessel, a step of impregnating the polyamide-based resin beads in the dispersion with a blowing agent, a step of retaining the dispersion at a temperature lower than the melting point of the polyamide-based resin, and a step of controlling the temperature of the dispersion immediately before expanding to a temperature lower than the melting point of the polyamide-based resin and then discharging the polyamide-based resin beads containing the blowing agent together with water from inside of the closed vessel to a space at a pressure lower than the pressure in the closed vessel to cause expanding.

A method 2 comprises a step of obtaining water-containing resin beads by allowing polyamide-based resin beads to absorb water, a step of impregnating the water-containing resin beads with a blowing agent in a closed vessel, and a step of heating the water-containing resin beads that contains the blowing agent to cause expanding.

Each of the methods is described as follows.
(Production Method of Polyamide-Based Resin Expanded Beads (Method 1))

A method 1 comprises a step of obtaining a dispersion by dispersing the polyamide-based resin beads in water in a closed vessel, a step of impregnating the polyamide-based resin beads in the dispersion with a blowing agent, a step of retaining the dispersion at a temperature lower than the melting point of the polyamide-based resin, and a step of causing expanding of the polyamide-based resin beads impregnated with the blowing agent.

Each of the steps is described as follows.
[Step of Obtaining Dispersion]

The step of obtaining a dispersion is a step of obtaining a dispersion by dispersing the polyamide-based resin beads in water in a closed vessel.

The method for dispersing the polyamide-based resin beads in water is not particularly limited and a known method may be used. For example, while stirring water with a stirrer, polyamide-based resin beads are added into the water, and a dispersion is able to be obtained by further stirring.

On an as needed basis, it is preferable that a dispersant such as inorganic material such as aluminum oxide, tricalcium phosphate, magnesium pyrophosphate, zinc oxide, kaolin, mica, talc and smectite, and a dispersion aid such as anionic surfactant such as sodium dodecylbenzene sulfonate and sodium alkane sulfonate be added. The mass ratio between the polyamide-based resin beads and the dispersant (resin beads/dispersant) is preferably 20 to 2000, more preferably 30 to 1000. The mass ratio between the dispersant and the dispersion aid (dispersant/dispersion aid) is preferably 1 to 500, more preferably 1 to 100.

[Step of Impregnating with Blowing Agent]

The step of impregnating with a blowing agent is a step of impregnating polyamide-based resin beads in a dispersion with a blowing agent. In the present step, along with the impregnation with a blowing agent, the polyamide-based resin beads are allowed to absorb water. Although the method for impregnating the polyamide-based resin beads with a blowing agent is not particularly limited, it is preferable that the polyamide-based resin beads be dispersed in water in a pressurizable closed vessel such as autoclave so as to be impregnated with the blowing agent. From the viewpoint of sufficiently impregnating the polyamide-based resin beads with the blowing agent in a short time, it is preferable that the impregnation of the polyamide-based resin beads with the blowing agent be performed by heating in addition to pressurization.

From the viewpoint of sufficiently impregnating the polyamide-based resin beads with the blowing agent in a short time, the temperature during impregnation by heating is preferably 50° C. or more, more preferably 80° C. or more, and preferably the melting point (Tm (° C.)) of the polyamide-based resin beads or less, more preferably (Tm−20 (° C.)) or less.

From the viewpoint of sufficiently impregnating the polyamide-based resin beads with the blowing agent in a short time, it is preferable that the pressure during impregnation under pressurized conditions (hereinafter also referred to as impregnation pressure) be controlled such that the pressure in the closed vessel after addition of blowing agent to the vessel containing the dispersion is 1.5 MPa (G) or more, more preferably 2.5 MPa (G) or more, and 7.0 MPa (G) or less, more preferably 5.0 MPa (G) or less.

"1.5 MPa (G)" means that the gauge pressure is 1.5 MPa.

The period from the step of obtaining the dispersion by dispersing the polyamide-based resin beads in water until the step of retaining the dispersion has the role of allowing the polyamide-based resin beads to absorb water.

From the viewpoint of allowing the polyamide-based resin beads to sufficiently absorb water, the temperature rising rate is preferably 10° C./min or less, more preferably 7° C./min or less. On the other hand, from the viewpoint of productivity of the polyamide-based resin expanded beads, the temperature rising rate is preferably 1° C./min or more, more preferably 2° C./min or more.

(Blowing Agent)

As the blowing agent, a physical blowing agent may be used. Examples of the physical blowing agent include an organic physical blowing agent such as an aliphatic hydrocarbon such as propane, butane, pentane, hexane and heptane, an alicyclic hydrocarbon such as cyclopentane and cyclohexane, a halogenated hydrocarbon such as chlorofluoromethane, trifluoromethane, 1,1-difluoroethane, 1,1,1,2-tetrafluoroethane, methyl chloride, ethyl chloride, methylene chloride, and a dialkyl ether such as dimethyl ether, diethyl ether and methyl ethyl ether. Examples of the inorganic physical blowing agent include carbon dioxide, nitrogen, helium, argon and air.

From the viewpoints of less impact on the environment and excellence in safety due to inflammability, among the physical blowing agents, an inorganic physical blowing agent is preferred. Carbon dioxide or nitrogen is more preferred and carbon dioxide is still more preferred.

[Retention Step]

The retention step is a step of retaining the dispersion at a temperature lower than the melting point of the polyamide-based resin. The retention step is a step of heating the above polyamide-based resin beads in a water-containing state.

From the viewpoint of increasing the crystallite size, the retention temperature of the dispersion in the retention step is preferably equal to or higher than a temperature 90° C. lower than the melting point (Tm) of the polyamide-based resin (Tm−90° C.), more preferably equal to or higher than a temperature 80° C. lower than the melting point (Tm−80° C.), still more preferably equal to or higher than a temperature 70° C. lower than the melting point (Tm−70° C.), furthermore preferably equal to or higher than a temperature 65° C. lower than the melting point (Tm−65° C.). On the other hand, the retention temperature of the dispersion in the retention step is preferably lower than a temperature 50° C. lower than the melting point (Tm) of the polyamide-based resin (Tm−50° C.), more preferably equal to or lower than a temperature 55° C. lower than the melting point (Tm) (Tm−55° C.), still more preferably equal to or lower than a temperature 57° C. lower than the melting point (Tm) (Tm−57° C.), furthermore preferably equal to or lower than a temperature 59° C. lower than the melting point (Tm) (Tm−59° C.).

It is conceivable that water for use as the dispersion medium plasticizes the polyamide-based resin beads, and the retention at a temperature in the specified range enables the production of expanded beads having a desired crystallite size.

From the viewpoint of more easily growing the crystallite in the specified range, the retention time in the retention step is preferably 5 minutes or more, more preferably 10 minutes or more, still more preferably 20 minutes or more. Also, the retention time in the retention step is preferably 60 minutes or less, more preferably 40 minutes or less. The retention for the above time period enables to obtain polyamide-based resin expanded beads having a large crystallite size. Further, expanded beads having a low apparent density and a high closed cell ratio tend to be obtained. In the retention step, a multi-step regulation may be set in the temperature range, or a slow temperature rising process for a sufficient time in the temperature range may be employed. From the viewpoint of more easily growing the crystallite, it is preferable that the one-step regulation in the temperature range (constant retention temperature) be set to retain the temperature for the above time.

From the viewpoints of allowing the polyamide-based resin to sufficiently absorb water and uniformly impregnating the polyamide-based resin with a blowing agent, it is preferable that the retention step be performed under pressurized conditions, and a same pressure as the impregnation pressure be retained. The pressure in the vessel containing the dispersion is controlled to preferably 1.5 MPa (G) or more, more preferably 2.5 MPa (G) or more. Also, the pressure in the vessel containing the dispersion is controlled to 7.0 MPa (G) or less, more preferably 5.0 MPa (G) or less.

[Expanding Step]

An expanding step is a step of causing expanding of the polyamide-based resin beads impregnated with a blowing agent.

Although the expanding method of the polyamide-based resin beads is not particularly limited, an expanding method including, following the retention step, a step of discharging the polyamide-based resin beads impregnated with the blowing agent together with water to an atmosphere at a pressure lower than the pressure in the closed vessel (usually at atmospheric pressure) to cause expanding, is preferred.

From the viewpoint of obtaining a polyamide-based resin expanded beads having a low apparent density and a high closed cell ratio, the temperature Te of the dispersion immediately before expanding (hereinafter also referred to as expanding temperature) is preferably equal to or higher than a temperature 90° C. lower than the melting point (Tm) of the polyamide-based resin (Tm−90° C.), more preferably equal to or higher than a temperature 80° C. lower than the melting point (Tm) (Tm−80° C.), still more preferably equal to or higher than a temperature 70° C. lower than the melting point (Tm) (Tm−70° C.), furthermore preferably equal to or higher than a temperature 65° C. lower than the melting point (Tm) (Tm−65° C.). Also, the expanding temperature is preferably lower than a temperature 50° C. lower than the melting point (Tm) of the polyamide-based resin (Tm−50° C.), more preferably equal to or lower than a temperature 55° C. lower than the melting point (Tm) (Tm−55° C.), still more preferably equal to or lower than a temperature 57° C. lower than the melting point (Tm) (Tm−57° C.), furthermore preferably equal to or lower than a temperature 59° C. lower than the melting point (Tm) (Tm−59° C.).

In the expanding step, the pressure immediately before discharging (expanding pressure) is preferably 0.5 MPa (G) or more, more preferably 1.5 MPa (G) or more, still more preferably 2.5 MPa (G) or more. Also, the expanding pressure is preferably 10.0 MPa (G) or less, more preferably 7.0 MPa (G) or less, still more preferably 5.0 MPa or less.

Further, in the expanding step, when the polyamide-based resin beads impregnated with the blowing agent are discharged together with water under a pressure lower than the pressure in the closed vessel, it is preferable that the temperature of the atmosphere into which the beads are discharged be retained high.

In other words, in the production method according to the method 1, it is preferable that in the expanding step, the temperature of the dispersion immediately before expanding be controlled to a temperature lower than the melting point of the polyamide-based resin and, when the polyamide-based resin beads containing the blowing agent are discharged together with water from inside of the closed vessel at a pressure lower than the pressure in the closed vessel to cause expanding, the atmospheric temperature be retained high. The atmospheric temperature refers to a temperature of the atmosphere with which the dispersion comes into contact immediately after discharging of the dispersion from the closed vessel. As the method for retaining the atmospheric temperature high, although a method for retaining the atmospheric temperature high by steam is preferred, a method for retaining the atmospheric temperature high by high-temperature air may be used. Retaining the temperature of the atmosphere into which the resin beads are discharged high enables to accelerate the growth of the crystallite of the resin beads, so that the resulting polyamide-based resin expanded beads are able to have a larger crystallite size. The above atmospheric temperature is preferably 80 to 120° C. The pressure is preferably 0.05 to 0.3 MPa (G).

(Production Method of Polyamide-Based Resin Expanded Beads (Method 2))

A method 2 comprises a step of obtaining water-containing resin beads by allowing polyamide-based resin beads to absorb water, a step of impregnating the resin beads with a blowing agent in a closed vessel, and a step of heating the water-containing resin beads that contains the blowing agent to cause expanding.

Each of the steps are described as follows. The sequence of the step of obtaining water-containing resin beads and the step of impregnating the resin beads with a blowing agent is not particularly limited. The step of impregnating the resin beads with a blowing agent may be performed after the step of obtaining water-containing resin beads, or the step of obtaining water-containing resin beads may be performed after the step of impregnating the resin beads with a blowing agent. Alternatively, the step of obtaining a water-containing resin beads and the step of impregnating the resin beads with a blowing agent may be performed at the same time.

[Step of Obtaining Water-Containing Resin Beads]

The step of obtaining water-containing resin beads is a step of allowing the polyamide-based resin beads to absorb water.

Examples of the method for allowing the polyamide-based resin beads to absorb water include a method of immersing the polyamide-based resin beads in water.

Although the immersion conditions are not particularly limited as long as sufficient water is absorbed in the polyamide-based resin beads, it is preferable that, for example, a vessel be filled with the polyamide-based resin beads and water in a quantity allowing the polyamide-based resin beads are completely immersed at the following temperature for the following time period.

From the viewpoint of sufficiently impregnating the polyamide-based resin beads with water for a short time, the temperature during immersion is preferably 10° C. or more, more preferably 15° C. or more, and preferably 100° C. or less, more preferably 80° C. or less.

The immersion time period is preferably 20 minutes or more, more preferably 40 minutes or more. From the viewpoint of reducing the production time, the upper limit of the immersion time period is about 24 hours. The step of obtaining water-containing resin beads may be performed under pressurized conditions.

[Step of Impregnating with Blowing Agent]

In the step of impregnating with a blowing agent, although the method of impregnating the polyamide-based resin beads with a blowing agent is not particularly limited, it is preferable that a pressurizable closed vessel such as an autoclave be charged with the polyamide-based resin beads so as to be impregnated with a blowing agent. When the water-containing resin beads are transferred from a vessel used in the step of obtaining a water-containing resin beads (vessel 1) to a vessel used in the step of impregnating with a blowing agent (vessel 2), the resin beads containing water are taken out from the vessel 1 and fed into the vessel 2 without removing the water on the resin beads surface.

From the viewpoint of sufficiently impregnating the polyamide-based resin beads with a blowing agent in a short time, the temperature during impregnation is preferably 0° C. or more, more preferably 5° C. or more. From the viewpoint of preventing the resin beads adhering to each other, the temperature is preferably 80° C. or less, more preferably 60° C. or less.

From the viewpoint of sufficiently impregnating the polyamide-based resin beads with a blowing agent in a short time, the pressure during impregnation under pressurized conditions (impregnation pressure) is controlled such that addition of the blowing agent into the pressure vessel containing the beads results in a pressure in the pressure vessel of preferably 1.5 MPa (G) or more, more preferably 2.5 MPa (G) or more, and preferably 7.0 MPa (G) or less, more preferably 5.0 MPa (G) or less.

The total time in the step of impregnating with a blowing agent is preferably 30 minutes or more, more preferably 60 minutes or more. On the other hand, from the viewpoint of productivity of the polyamide-based resin expanded beads, the total time in the step of impregnating with a blowing agent is preferably 300 minutes or less, more preferably 240 minutes or less.

After addition of the blowing agent, the pressure is gradually reduced to an atmospheric pressure to obtain a water-containing resin beads containing the blowing agent.

[Expanding Step]

The expanding step is a step of heating the water-containing resin beads containing the blowing agent to cause expanding of the polyamide-based resin beads impregnated with the blowing agent. The expanding step is a step of heating the above polyamide-based resin beads in a water-containing state.

Although the expanding method of the polyamide-based resin beads is not particularly limited, for example, heating the water-containing polyamide-based resin beads impregnated with the blowing agent with a heating medium such as steam, high-temperature air, and oil to cause expanding.

[Polyamide-Based Resin Expanded Beads Molded Body]

A polyamide-based resin expanded beads molded body (expanded molded body) is able to be obtained by in-mold molding of the polyamide-based resin expanded beads of the present invention. In other words, the resulting expanded molded body is made by in-mold molding of the polyamide-based resin expanded beads of the present invention.

A conventional method may be used for the in-mold molding, and use of heating by steam is preferred. Steam allows the polyamide-based resin in the polyamide-based resin expanded beads to be plasticized through water absorption, so that the forming steam pressure can be reduced. The resulting molded body is dried to restore the original properties of the polyamide-based resin, so that a molded body having a high heat resistance can be obtained.

The polyamide-based resin expanded beads of the present invention include crystallites grown large, so that excellent in-mold formability is achieved to make an excellent expanded beads molded body. Further, due to excellence in heat resistance of the expanded beads, a light-weight molded body excellent in heat resistance can be made therefrom. Specifically, excellence in in-mold formability means excellence in surface properties, fusion bonding properties and restorability during in-mold molding to obtain a molded body, so that forming is possible under a wide range of pressure. Due to excellence in in-mold formability, the polyamide-based resin expanded beads of the present invention are made into an excellent molded body even having a large thickness. For example, the thick molded body has a thickness of preferably 30 mm or more, more preferably 40 mm or more, still more preferably 50 mm or more. In other words, the thickness of the polyamide-based resin expanded beads molded body of the present invention is preferably 30 mm or more, more preferably 40 mm or more, still more preferably 50 mm or more.

The density of a molded body of the polyamide-based resin expanded beads molded body of the present invention is preferably 20 kg/m$^3$ or more, more preferably 40 kg/m$^3$ or more, still more preferably 50 kg/m$^3$ or more. Also, the density of a molded body is preferably 300 kg/m$^3$ or less, more preferably 250 kg/m$^3$ or less, still more preferably 200 kg/m$^3$ or less, furthermore preferably 150 kg/m$^3$ or less.

If the density of a molded body is in the above range, excellent balance between the light weight and the strength of the molded body is achieved.

The density of a molded body is measured by the following method.

First, an expanded beads molded body left standing under conditions at a temperature of 23° C. and a relative humidity of 50% for 24 hours or more is cut into rectangular parallelepiped samples having appropriate sizes (with removal of forming skin). The apparent volume of each of the samples is determined from the external dimensions of each of the samples, and the total thereof is defined as the apparent volume H of the samples. The total weight W of the samples each is divided by the apparent volume H to determine the density of the molded body [kg/m$^3$].

The closed cell ratio of a polyamide-based resin expanded beads molded body in the present specification is preferably 80% or more, more preferably 85% or more, still more preferably 90% or more. With a closed cell ratio of an expanded beads molded body satisfying the above range, an expanded beads molded body having a low apparent density tends to be obtained. When the closed cell ratio of an expanded beads molded body satisfies the range, expanded beads having a low apparent density tends to be obtained. The closed cell ratio of an expanded beads molded body means a ratio of the volume of closed cells relative to the volume of the foams contained in the expanded beads constituting an expanded beads molded body (total of the volume of closed cells and the volume of open cells), which may be determined using an air pycnometer in accordance with a procedure C described in ASTM-D2856-70.

As described above, by using polyamide-based resin expanded beads having a large crystallite size, a molded body having a low apparent density and a high closed cell ratio is able to be obtained.

EXAMPLES

The present invention is described in detail with reference to Examples as follows, though the present invention is not limited thereto.

Each of the physical properties of the polyamide-based resin and the polyamide-based resin beads in each production Example was measured by the following method.
[Measurement of Physical Properties of Polyamide-Based Resin and Polyamide-Based Resin Beads]
[Melting Point (Tm)]

By the heat-flux differential scanning calorimetry based on JIS K7121-1987, the melting point of polyamide-based resin beads was measured. Heating (first temperature rising) was performed from 30° C. to a temperature 30° C. higher than the temperature at the end of a melting peak at a heating rate of 10° C./min under a condition of a nitrogen inflow of 30 mL/min. After retaining the temperature for 10 minutes, cooling was performed to 30° C. at a cooling rate of 10° C./min, and heating was performed again to a temperature 30° C. higher than the temperature at the end of a melting peak at a heating rate of 10° C./min. The peak top temperature of a melting peak in the resulting DSC curve in the second heating was defined as the melting point (Tm). A high-sensitive differential scanning calorimeter "EXSTAR DSC7020" (manufactured by SII Nano Technology Inc.) was used as the measurement apparatus. In the measurement of the DSC curve, polyamide-based resin beads left standing under an environment at a temperature of 23° C. and a relative humidity of 50% for 24 hours or more were used.
[Density]

A catalogue value determined by the method described in ISO 1183-3 was employed.
[Flexural Modulus]

The flexural modulus of a polyamide-based resin was determined by the measurement in accordance with JIS K7171: 2016. A resin test piece having a thickness of 4 mm, a width of 10 mm, and a length of 80 mm was prepared and left standing at a room temperature of 23° C. and a relative humidity of 50% for 72 hours. The measurement was then performed under conditions of a distance between fulcrums of 64 mm, an indenter radius of 15.0 mm, a support radius of 25.0 mm, a test rate of 2 mm/min, a room temperature of 23° C., and a relative humidity of 50%, using a testing machine Autograph AGS-10kNG (manufactured by Shimadzu Corporation). The average of calculated values (at 5 points) was used as the flexural modulus.

The flexural modulus of an amide-based elastomer (manufactured by Arkema S.A., product name "PEBAX 5533", melting point: 159° C., density: 1.01 g/cm$^3$) was measured to be 150 MPa by the method described above.
[Production of Polyamide-Based Resin Beads]

Production Example 1

To an extruder, a polyamide-based resin (5033B, details shown in Table 1) was supplied. As a cell controlling agent, 0.8000 parts by mass of "Talcum Powder PK-S" (manufactured by Hayashi Kasei Co., Ltd.) was added to 100 parts by mass of the polyamide-based resin, and as an end-capping agent, 1 part by mass of an aromatic polycarbodiimide ("Stabaxol P", manufactured by Rhein Chemie Corporation) was supplied to 100 parts by mass of the polyamide-based resin. The mixture was melted and kneaded. The molten kneaded product was extruded in a strand form having a circular cross section from a small ferrule opening attached to the tip of the extruder so as to be cooled with water. The strand was cut into pieces having an average weight of 2 mg with a pelletizer and dried to obtain polyamide-based resin beads.

Production Example 2

Polyamide-based resin beads were obtained in the same manner as in Production Example 1, except that the polyamide-based resin was replaced from 5033B to 1030B (details shown in Table 1).

Production Example 3

Polyamide-based resin beads were obtained in the same manner as in Production Example 1, except that the polyamide-based resin was replaced from 5033B to E2046 (details shown in Table 1) and the end-capping agent was replaced from Stabaxol P to an aromatic polycarbodiimide (Stabaxol P100, manufactured by Rhein Chemie Corporation).

Production Example 4

Polyamide-based resin beads were obtained in the same manner as in Production Example 1, except that no end-capping agent (Stabaxol P) was used.

TABLE 1

| Abbreviation | Resin composition | Melting point (° C.) | Density (g/cm³) | Flexural modulus (MPa) | Manufacturer | Product name |
|---|---|---|---|---|---|---|
| 5033B | Polyamide 6/66 copolymer (nylon 6/66), Polyamide 6/Polyamide 66 = 85/15 | 197 | 1.14 | 1260 | Ube Industries Ltd. | Ube Nylon 5033B |
| 1030B | Polyamide 6 (nylon 6) | 220 | 1.14 | 1770 | Ube Industries Ltd. | Ube Nylon 1030B |
| E2046 | Polyamide 66 (nylon 66) | 259 | 1.14 | 2050 | Unitika Ltd. | — |

Each of the physical properties of the polyamide-based resin expanded beads in Examples each and Comparative Example was measured by the following method.

[Measurement of Physical Properties of Polyamide-Based Resin Expanded Beads]

Various physical properties of the polyamide-based resin expanded beads except for moisture content were measured after the following condition adjustment. First, the resulting polyamide-based resin expanded beads were placed under conditions at a temperature of 60° C. for 24 hours, and gradually cooled to room temperature (23° C.). Subsequently, the beads were left standing under an environment at a temperature of 23° C., a relative humidity of 50%, and a pressure of 1 atm for 24 hours for condition adjustment.

[Moisture Content]

Immediately after expanding, the polyamide-based resin expanded beads were randomly selected. After moisture on the surface of the expanded beads was wiped off with a dry cloth, about 0.2 g of the expanded beads were weighed. Subsequently, the expanded beads were heated to 160° C. to vaporize internal moisture of the expanded beads using a heating moisture vaporizer. The moisture content was measured through Karl Fischer titration (coulometric titration) using a Karl Fischer moisture analyzer (AQ-2200A, manufactured by Hiranuma Sangyo Co., Ltd.).

[Crystallite Size]

The crystallite size of the polyamide-based resin expanded beads was obtained by the following method. The resulting polyamide-based resin expanded beads were subjected to X-ray diffraction (XRD) method based on a reflection method using an X-ray scattering apparatus "SmartLab SE" (manufactured by Rigaku Corporation). As the detector, a semiconductor primary detector D/teX Ultra 250 was used. As the test piece, a test piece for use was prepared by filling a test piece holder having a diameter of 24 mm with the expanded beads randomly selected as dense as possible within a range causing no overlapping. Empty cell scattering correction was also performed. The one-dimensional X-ray diffraction profile thus obtained was subjected to peak separation into diffraction peaks derived from the crystal and peaks derived from amorphous material, with use of a software (trade name: SmartLab Studio II), assuming that the peak shape was given by a Gaussian function. The full width half maximum β (rad) of a peak having the narrowest peak width among the peaks obtained by the peak separation was calculated to determine the crystallite size D of the expanded beads based on the following formula (2) using the full width half maximum β. The above measurement was performed for 10 test pieces, and arithmetic means thereof was defined as the crystallite size of the expanded beads.

$$D=0.9\lambda/((\beta^2-b^2)^{1/2} \cos \theta) \quad (2)$$

[Total Heat of Melting Determined from DSC Curve During First Heating]

In the measurement, a high-sensitive differential scanning calorimeter "EXSTAR DSC7020" (manufactured by SII Nano Technology Inc.) was used.

Based on the heat-flux differential scanning calorimetry in accordance with JIS K7122-1987, a test piece of polyamide-based resin expanded beads was heated from 30° C. to a temperature 30° C. higher than the temperature at the end of a melting peak at a heating rate of 10° C./min so as to obtain a DSC curve in the first heating.

On a resulting DSC curve, a straight line connecting a point at 150° C. on the DSC curve to a point indicating the temperature at the end of a melting peak on the DSC curve was drawn. The straight line was defined as base line. The quantity of heat calculated from an area surrounded by the base line and the DSC curve present on the endothermic side than the base line was defined as the total heat of melting of the DSC curve in the first heating.

[Peak Top Temperature of Melting Peak in DSC Curve in Second Heating]

In the measurement, a high-sensitive differential scanning calorimeter "EXSTAR DSC7020" (manufactured by SII Nano Technology Inc.) was used.

Based on the heat-flux differential scanning calorimetry in accordance with JIS K7121-1987, a test piece of polyamide-based resin expanded beads was heated from 30° C. to a temperature 30° C. higher than the temperature at the end of a melting peak at a heating rate of 10° C./min, and retained at the temperature for 10 minutes.

The test piece was then cooled to 30° C. at a cooling rate of 10° C./min, and heated again from 30° C. to a temperature 30° C. higher than a temperature at the end of a melting peak at a heating rate of 10° C./min to obtain a DSC curve in the second heating.

In the resulting DSC curve, the peak top temperature of the maximum melting peak (endothermic peak) appearing on the DSC curve was defined as the peak top temperature of a melting peak in the DSC curve in the second heating.

[Apparent Density of Polyamide-Based Resin Expanded Beads]

A measuring cylinder containing water at a temperature of 23° C. was prepared. The mass W1 of expanded beads having a bulk volume of about 500 cm³ was measured and sunk into the water using a wire mesh in the measuring cylinder. Considering the volume of the wire mesh, the volume V1 [cm³] of the expanded beads was measured based on the water level rising. The apparent density of the expanded beads was obtained by dividing the mass W1 [g] of the expanded beads by the volume V1, i.e., (W1/V1), and converting the unit into [kg/m³].

[Average Cell Size]

First, an expanded bead was split into about two through the center of the expanded bead, and a cross section thereof was photographed with a scanning electron microscope. Next, on the resulting cross-sectional photograph, straight lines were drawn in 8 directions at equal intervals of 45° from near the center of the cross-section of the expanded bead to the surface of the expanded bead, and the number of all the cells intersecting with the lines was counted. The value obtained by dividing the total length of the lines by the number of cells counted was defined as the cell size of the expanded bead. The procedure was performed in the same manner for 30 expanded beads, and the arithmetic means of the cell sizes of the respective expanded beads was defined as the average cell size of the expanded beads.

[Surface Layer Film Thickness]

On the straight lines drawn in 8 directions for the measurement of the above average cell size, the respective lengths from the outermost surface of the expanded bead to a cell positioned outermost of the expanded bead (thickness of the outermost surface layer) were measured. The arithmetic means thereof were taken as the average thickness of the outermost surface layer of the expanded beads each. The arithmetic means of the values of 30 expanded beads was taken to determine the average surface layer film thickness of the expanded beads.

[Closed Cell Ratio of Polyamide-Based Resin Expanded Beads]

In accordance with a procedure C described in ASTM-D2856-70, the value of true volume Vx of expanded beads (sum of the volume of resin constituting the expanded beads and the total volume of cells in a portion of closed cells in expanded beads) was measured. In the measurement of the true volume Vx, an air pycnometer "930" manufactured by Beckman-Toshiba Ltd., was used. Subsequently, the closed cell ratio was calculated by the following formula (1), and the arithmetic average of the 5 times measurement results was determined.

$$\text{Closed cell ratio (\%)} = (Vx - W/\rho) \times 100 / (Va - W/\rho) \tag{1}$$

Vx: True volume of expanded beads measured by the above method (cm³)

Va: Apparent volume of expanded beads (cm³)

W: Mass of sample for use in measurement of expanded beads (g)

ρ: Density of resin constituting expanded beads (g/cm³)

[Evaluation of Polyamide-Based Resin Expanded Beads]

[Ratio of 5%-Compressive Stress at a Temperature 20° C. Lower than the Melting Point of Polyamide-Based Resin Expanded Beads (Tm1–20° C.) to 5%-Compressive Stress at 23° C.]

The expanded bead was measured using a thermal analysis apparatus (TMA; "TMA 7100" manufactured by Hitachi High-Tech Science Corporation) at compression mode (tip diameter of compression probe: 3.5 mm). Specifically, one expanded bead randomly selected was held in the minor axis direction of the expanded bead under a load of 10 mN with a compression probe, and heated to a predetermined temperature. Then, during isothermal retention at the temperature, pushing at a rate of 1 mm/min was performed to monitor the load of the probe. The stress at a time when the thickness of the expanded beads reaches 5% of the thickness of the expanded bead before compressed was recorded. The procedure was repeated three times, and the arithmetic average thereof was defined as the 5%-compressive stress.

As described in Table 2, the predetermined temperature is a temperature 20° C. lower than the melting point of the polyamide-based resin expanded beads used for the polyamide-based resin expanded beads molded body (Tm1–20° C.), or 23° C.

Further, using the measured values obtained from the measurement, the ratio of 5%-compressive stress at a temperature 20° C. lower than the melting point of the polyamide-based resin expanded beads (Tm1-20° C.) to 5%-compressive stress at 23° C., i.e., [(Compressive stress at (Tm1–20° C.))/(Compressive stress at 23° C.)], was calculated. The procedure was performed for three pieces of the expanded beads, and the arithmetic average of thereof was defined as the ratio of 5%-compressive stress at a temperature 20° C. lower than the melting point of the polyamide-based resin expanded beads (Tm1-20° C.) to 5%-compressive stress at 23° C., i.e., [(Compressive stress at (Tm1–20° C.))/(Compressive stress at 23° C.)].

As the ratio value increases, more excellent heat resistance can be achieved. The polyamide-based resin expanded beads having excellent heat resistance are compounded by mixing or layering with a thermosetting resin in an uncured state, and the thermosetting resin is cured to make a composite, which is suitable for use requiring heat resistance.

[Production of Polyamide-Based Resin Expanded Beads]

Example 1

A 5-L autoclave having a stirrer was charged with 1 kg of the polyamide-based resin beads obtained in Production Example 1 and 3-L of water as dispersion. Further, relative to 100 parts by mass of the polyamide-based resin beads, 0.3 parts by mass of kaolin as dispersant and 0.004 parts by mass of sodium alkylbenzene sulfonate as surfactant were added to the dispersion. While stirring the contents in the autoclave, during temperature rising from the room temperature (23° C.) to 136° C. (impregnation temperature), carbon dioxide as blowing agent was injected into the autoclave until the pressure in the autoclave reached 4.0 MPa (G) (impregnation pressure). On this occasion, the heating-up period from room temperature (23° C.) to the impregnation temperature was 40 minutes. Subsequently, the conditions at 136° C. (retention temperature) and 4 MPa (G) (retention pressure) were retained for 30 minutes.

The polyamide-based resin beads impregnated with the blowing agent was then discharged together with the dispersion under atmospheric pressure (0.1 MPa). The expanding temperature (temperature Te of dispersion immediately before expanding) was 136° C. The resulting polyamide-based resin expanded beads were cured in an oven at 60° C. for 24 hours and then gradually cooled.

The physical properties of the resulting polyamide-based resin expanded beads are shown in Table 2. The moisture content of the polyamide-resin expanded beads immediately after expanding in Example 1 were measured to be 18%. The moisture content of the polyamide-based resin expanded beads was higher than the saturated moisture content of the polyamide-based resin. It is conceivable that the polyamide-based resin expanded beads were in a supersaturated water absorption state, so that the moisture content of the polyamide-based resin expanded beads was higher than the saturated moisture content of the polyamide-based resin. It is also conceivable that the moisture content of the polyamide-based resin expanded beads in the autoclave is at least higher than the moisture content of the polyamide-based resin expanded beads immediately after expanding, though it is difficult to measure the content.

Example 2

Polyamide-based resin expanded beads were obtained by the same method as in Example 1, except that the polyamide-based resin beads obtained in Production Example 2 were used and the impregnation temperature, retention temperature and expanding temperature were controlled to 158° C.

Example 3

Polyamide-based resin expanded beads were obtained by the same method as in Example 1, except that the polyamide-based resin beads obtained in Production Example 3 were used and the impregnation temperature, retention temperature and expanding temperature were controlled to 175.5° C.

Example 4

Polyamide-based resin expanded beads were obtained by the same method as in Example 1, except that the polyamide-based resin beads obtained in Production Example 4 were used.

Example 5

In the present Example, the production was performed in the same manner as in Example 1, except that the polyamide-based resin beads impregnated with a blowing agent was discharged from the inside of an autoclave to the atmospheric pressure, while supplying steam at a pressure of 0.1 MPa (G) to the outlet of the valve. The ambient temperature of the dispersion in the portion where the dispersion containing the polyamide-based resin beads and water came in contact with the steam was 100° C.

Example 6

In 6-L of water, 3 kg of the polyamide-based resin beads obtained in Production Example 1 were completely immersed and left standing for 1 hour.

Subsequently, an autoclave was charged with the resin beads taken out from the water, and carbon dioxide as blowing agent was injected into the autoclave until the pressure in the autoclave reached 4 MPa (G) (impregnation pressure). Subsequently, the conditions at 10° C. (impregnation temperature) and 4 MPa (G) were retained for 3 hours.

The polyamide-based resin beads impregnated with the blowing agent was then taken out from the autoclave, and transferred to an expanding vessel filled with an oil medium heated to the temperature shown in Table 2 (expanding temperature), in which the polyamide-based resin beads impregnated with the blowing agent were immersed to cause expanding. The surface of the resulting polyamide-based resin expanded beads was washed with normal hexane to remove oil. The polyamide-based resin expanded beads were then cured in an oven at 60° C. for 24 hours and gradually cooled.

The physical properties of the resulting polyamide-based resin expanded beads are shown in Table 2. The moisture content of the polyamide-based resin beads immediately before expanding was measured to be 6.2%.

Example 7

In the present Example, polyamide-based resin expanded beads were obtained by the same method in Example 1, except that the retention temperature was changed to 139° C. and the expanding temperature was changed to 135° C.

Comparative Example 1

An autoclave was charged with 3 kg of the polyamide-based resin beads obtained in Production Example 1, and carbon dioxide as blowing agent was injected into the autoclave until the pressure in the autoclave reached 4 MPa (G) (impregnation pressure). Subsequently, the conditions at 10° C. (impregnation temperature) and 4 MPa (G) were retained for 3 hours.

The polyamide-based resin beads impregnated with the blowing agent were then transferred to an expanding apparatus, into which air at the temperature shown in Table 2 (expanding temperature) was blown for 20 seconds to obtain polyamide-based resin expanded beads. The resulting polyamide-based resin expanded beads were cured in an oven at 60° C. for 24 hours and gradually cooled.

The physical properties of the resulting polyamide-based resin expanded beads are shown in Table 2. The moisture content of the polyamide-based resin beads immediately before expanding was measured to be 3.0%.

[Evaluation on Formability of Polyamide-Based Resin Expanded Beads and Polyamide-Based Resin Expanded Beads Molded Body]

The evaluation on the formability of the polyamide-based resin expanded beads in Examples each and Comparative Example was performed by the following methods, and the physical properties of the resulting molded bodies were measured by the following methods.

[Production of Polyamide-Based Resin Expanded Beads Molded Body]

First, a plate-forming mold having a length of 300 mm, a width of 300 mm and a thickness of 50 mm was filled with the polyamide-based resin expanded beads obtained in Examples 1 to 7 each or Comparative Example 1, and in-mold molding was performed by steam heating to obtain an expanded beads molded body in a plate form. The heating method included the successive steps of supplying steam for 5 seconds with drain valves on both sides of the mold opened for preheating (exhaustion step), performing one-side heating with a pressure lower than the forming steam pressure shown in Table 2 by 0.04 MPa (G), performing one-side heating from the opposite direction with a pressure lower than the forming steam pressure shown in Table 2 by 0.02 MPa (G), and performing final heating from both sides with the forming steam pressure shown in Table 2. After heating, the pressure was discharged, and the molded body was cooled with water until the surface pressure by the expanding force of the molded body decreased to 0.02 MPa (gauge pressure). The mold was then opened to take out the molded body from the mold. The resulting molded body was cured in an oven at 80° C. for 12 hours and then gradually cooled to room temperature. The polyamide expanded beads molded body was thus obtained. For the molded body at each forming steam pressure, the formability of the expanded beads was evaluated, and the physical properties of the molded body were also measured. The results are shown in Table 2.

[Evaluation on Formability of Polyamide-Based Resin Expanded Beads]

The polyamide-based resin expanded beads molded body obtained by the production method was subjected to measurement of the restorability, surface properties, and fusion bonding properties for evaluation on the formability of the polyamide-based resin expanded beads. The evaluation methods are shown below.

(Restorability of Expanded Beads Molded Body)

The thicknesses of an end portion (10 mm inside from the end) and a central portion (portion equally dividing in the longitudinal direction and in the cross direction) of the expanded beads molded body corresponding to the dimensions of the mold in a plate shape used in the in-mold molding were measured. Subsequently, a thickness ratio of the expanded beads molded body ((Thickness of central portion of the molded body)/(Thickness of the end portion of the molded body)×100(%)) was calculated for evaluation as follows. As the thickness ratio increases, the more excellent restorability can be obtained to achieve good formability.

A: Thickness ratio is 95% or more.
B: Thickness ratio is less than 95%.

(Surface Properties of Expanded Beads Molded Body)

The surface properties of an expanded beads molded body were evaluated as follows. As the gap between expanded beads at the surface of a molded body is more filled, the more excellent surface properties of the expanded beads molded body are obtained to achieve good formability.

A: The gap between expanded beads at the surface of a molded body is filled.
B: The gap between expanded beads at the surface of a molded body is unfilled.

(Fusion Bonding Properties of Expanded Beads Molded Body)

The fusion ratio of a molded body was determined based on the proportion of the number of the expanded beads subjected to material breakage in the expanded beads exposed to the fracture surface when a expanded beads molded body was fractured. Specifically, test pieces (length: 100 mm, width: 100 mm, thickness: thickness of the molded body) were cut out from the expanded beads molded body, and an about 5-mm notch was made in the thickness direction of each of the test pieces with a cutter knife to cause fracture of the test piece from the notch. Subsequently, the number of expanded beads present in the fracture surface of the expanded beads molded body (n) and the number of the expanded beads subjected to material breakage (b) were measured. The ratio between (b) and (n), i.e., (material breakage at fracture surface: bin), was represented by percentage. As the value of the material breakage at fracture surface increases, the more excellent fusion bonding properties of the expanded beads are obtained to achieve good formability.

[Measurement of Physical Properties of Polyamide-Based Resin Expanded Beads Molded Body]

Various physical properties of a polyamide-based resin expanded beads molded body shown below were measured after the polyamide-based resin expanded beads molded body gradually cooled to room temperature was left standing in an environment at a temperature of 23° C. and a relative humidity of 50% for 24 hours.

(Density of Molded Body)

A sample (length: 100 mm, width: 100 mm, thickness: 30 mm) was cut out from an expanded beads molded body away from the skin surface. From the external dimensions of the sample, the apparent volume H of the sample was determined. The total weight W of the sample was divided by the apparent volume H to obtain the density of the molded body (W/H) [kg/m$^3$].

(Closed Cell Ratio of Polyamide-Based Resin Expanded Beads Molded Body)

A sample (length: 30 mm, width: 30 mm, thickness: 30 mm) was cut out from an expanded beads molded body away from the skin surface. In accordance with a procedure C described in ASTM-D2856-70, the value of true volume Vx of an expanded beads molded body (sum of the volume of resin constituting the expanded beads molded body and the total volume of cells in a portion of closed cells in an expanded beads molded body) was measured. In the measurement of the true volume Vx, an air pycnometer "930" manufactured by Beckman-Toshiba Ltd., was used. Subsequently, the closed cell ratio was calculated by the following formula (3), and the arithmetic average of the 5 times measurement results was determined.

$$\text{Closed cell ratio (\%)} = (Vx - W/\rho) \times 100/(Va - W/\rho) \quad (3)$$

Vx: True volume of expanded beads molded body measured by the above method (cm$^3$)
Va: Apparent volume of expanded beads molded body (cm$^3$)
W: Mass of sample for use in measurement of expanded beads molded body (g)
ρ: Density of resin constituting expanded beads molded body (g/cm$^3$)

TABLE 2

| | | | Example 1 | Example 2 | Example 3 | Example 4 | Example 5 | Example 6 | Example 7 | Comparative Example 1 |
|---|---|---|---|---|---|---|---|---|---|---|
| Resin beads | | Production Example No. | 1 | 2 | 3 | 4 | 1 | 1 | 1 | 1 |
| | | Raw material | 5033B | 1030B | E2046 | 5033B | 5033B | 5033B | 5033B | 5033B |
| | | End-capping agent* | P | P | P100 | — | P | P | P | P |
| | | Amount of end-capping agent Part by mass | 1 | 1 | 1 | — | 1 | 1 | 1 | 1 |
| Expanded beads | Production | Retention temperature ° C. | 136 | 158 | 175.5 | 136 | 136 | — | 139 | — |
| | | Expanding temperature ° C. | 136 | 158 | 175.5 | 136 | 136 | 210 | 135 | 240 |
| | Physical property | Crystallite size nm | 12 | 12 | 13 | 12 | 13 | 12 | 10 | 5 |
| | | Moisture content % | 18 | 16 | 18 | 16 | 15 | 3 | 18 | 1 |
| | | Total heat of melting of DSC curve in first heating J/g | 54 | 74 | 122 | 62 | 58 | 40 | 54 | 32 |
| | | Peak top temperature of melting peak in DSC curve in second heating ° C. | 191 | 217 | 261 | 191 | 191 | 191 | 191 | 191 |

TABLE 2-continued

|  |  |  |  | Example 1 | Example 2 | Example 3 | Example 4 | Example 5 | Example 6 | Example 7 | Comparative Example 1 |
|---|---|---|---|---|---|---|---|---|---|---|---|
|  |  | Apparent density | kg/m³ | 95 | 90 | 105 | 105 | 160 | 240 | 120 | 860 |
|  |  | Average cell size | μm | 120 | 100 | 130 | 120 | 100 | 160 | 116 | 180 |
|  |  | Surface layer film thickness | μm | 15 | 22 | 24 | 15 | 14 | 36 | 15 | 80 |
|  |  | Closed cell ratio | % | 94 | 92 | 90 | 95 | 96 | 90 | 91 | 74 |
|  | Evaluation | Heat resistance [(Compressive stress at (Tm1 − 20° C.))/(Compressive stress at 23° C.)] |  | 0.25 | 0.30 | 0.16 | 0.24 | 0.23 | 0.13 | 0.12 | 0.09 |
| Evaluation on formability |  | Forming steam pressure | MPa (G) | 0.16 | 0.44 | 0.60 | 0.16 | 0.16 | 0.12 | 0.16 | 0.16 |
|  |  | Restorability | — | A | A | A | A | A | A | A | A |
|  |  | Surface property | — | A | A | A | A | A | A | A | B |
|  |  | Fusion bonding property | % | 90 | 90 | 90 | 90 | 80 | 90 | 90 | 20 |
|  |  | Forming steam pressure | MPa (G) | 0.18 | 0.46 | 0.62 | 0.18 | 0.18 | 0.14 | 0.18 | 0.18 |
|  |  | Restorability | — | A | A | A | A | A | A | A | A |
|  |  | Surface property | — | A | A | A | A | A | A | A | B |
|  |  | Fusion bonding property | % | 90 | 90 | 90 | 90 | 90 | 90 | 90 | 20 |
|  |  | Forming steam pressure | MPa (G) | 0.20 | 0.48 | 0.64 | 0.20 | 0.20 | 0.16 | 0.20 | 0.20 |
|  |  | Restorability | — | A | A | A | A | A | A | B | A |
|  |  | Surface property | — | A | A | A | A | A | A | A | B |
|  |  | Fusion bonding property | % | 90 | 90 | 90 | 90 | 90 | 90 | 90 | 20 |
| Molded body | Physical property | Density of molded body | kg/m³ | 118 | 104 | 140 | 142 | 184 | 288 | 154 | 989 |
|  |  | Closed cell ratio | % | 92 | 90 | 87 | 91 | 92 | 87 | 86 | 68 |

*End-capping agent P: Stabaxol P, P100: Stabaxol P100

From the results shown in Table 2, it is suggested that the polyamide-based resin expanded beads in Examples are excellent in in-mold molding. Further, the polyamide-based resin expanded beads in Examples are excellent in heat resistance.

The invention claimed is:

1. Polyamide-based resin expanded beads having a crystallite size of more than 8 nm as measured by X-ray diffraction method.

2. The polyamide-based resin expanded beads according to claim 1, wherein the polyamide-based resin expanded beads as a test piece have a total heat of melting of 40 to 140 J/g in a DSC curve measured when heated from 30° C. to a temperature 30° C. higher than a temperature at the end of a melting peak at a heating rate of 10° C./min based on heat-flux differential scanning calorimetry in accordance with JIS K7122-1987.

3. The polyamide-based resin expanded beads according to claim 1, wherein the polyamide-based resin expanded beads have an apparent density of 10 to 300 kg/m³.

4. The polyamide-based resin expanded beads according to claim 1, wherein the polyamide-based resin expanded beads have a peak top temperature of a melting peak of 185 to 285° C. in a DSC curve in a second heating obtained under the following condition 1:

Condition 1

A DSC curve measured when polyamide-based resin expanded beads as a test piece is heated from 30° C. to a temperature 30° C. higher than a temperature at the end of a melting peak at a heating rate of 10° C./min, retained at the temperature for 10 minutes, cooled to 30° C. at a cooling rate of 10° C./min, and heated again to a temperature 30° C. higher than the temperature at the end of the melting peak at a heating rate of 10° C./min based on the heat-flux differential scanning calorimetry in accordance with JIS K7121-1987 is defined as the DSC curve in the second heating.

5. The polyamide-based resin expanded beads according to claim 1, wherein the polyamide-based resin expanded beads have a crystallite size of 10 nm or more as measured by X-ray diffraction method.

6. The polyamide-based resin expanded beads according to claim 1, wherein the polyamide-based resin expanded beads have a closed cell ratio of more than 90%.

7. The polyamide-based resin expanded beads according to claim 1, wherein the polyamide-based resin expanded beads have an average cell size of 20 to 200 μm.

8. The polyamide-based resin expanded beads according to claim 1, wherein the polyamide-based resin expanded beads have a surface layer film thickness of 5 to 50 μm.

9. The polyamide-based resin expanded beads according to claim 1, wherein the polyamide-based resin expanded beads have a ratio of 5%-compressive stress at a temperature 20° C. lower than a melting point (Tm1) of the polyamide-based resin expanded beads (Tm1−20° C.) to 5%-compressive stress at 23° C. (compressive stress at 23° C.), i.e., [(Compressive stress at (Tm1−20° C.))/(Compressive stress at 23° C.)], of 0.1 or more.

10. The polyamide-based resin expanded beads according to claim 1, wherein the polyamide-based resin expanded beads comprise a polyamide-based resin consisting of one or a combination of two or more selected from the group consisting of nylon 6, nylon 66, and nylon 6/66.

11. The polyamide-based resin expanded beads according to claim 10, wherein the polyamide-based resin is an end-capped polyamide-based resin with a capped functional group at a molecular chain end.

12. The polyamide-based resin expanded beads according to claim 10, wherein the polyamide-based resin has a melting point (Tm) of 180° C. or more.

13. The polyamide-based resin expanded beads according to claim 10, wherein the polyamide-based resin has a density of 1.05 g/cm³ or more.

14. A polyamide-based resin expanded beads molded body prepared by in-mold molding of the polyamide-based resin expanded beads according to claim 1.

15. The polyamide-based resin expanded beads molded body according to claim 14, wherein the polyamide-based resin expanded beads molded body has a thickness of 30 mm or more.

16. The polyamide-based resin expanded beads molded body according to claim 14, wherein the polyamide-based resin expanded beads molded body has a closed cell ratio of 80% or more.

17. A production method of the polyamide-based resin expanded beads according to claim 1, comprising:
- a step of dispersing the polyamide-based resin beads in water in a closed vessel to obtain a dispersion,
- a step of impregnating the polyamide-based resin beads in the dispersion with a blowing agent,
- a step of retaining the dispersion at a temperature lower than a melting point of the polyamide-based resin, and
- a step of controlling a temperature of the dispersion immediately before expanding to a temperature lower than the melting point of the polyamide-based resin and then discharging the polyamide-based resin beads containing the blowing agent together with water from inside of the closed vessel under a pressure lower than a pressure in the closed vessel to cause expanding.

18. A production method of the polyamide-based resin expanded beads according to claim 1, comprising:
- a step of obtaining a water-containing resin beads through absorption of water into the polyamide-based resin beads,
- a step of impregnating the water-containing resin beads with a blowing agent in a closed vessel, and
- a step of heating the water-containing resin beads that contains the blowing agent to cause expanding.

19. The production method of the polyamide-based resin expanded beads according to claim 17, wherein the polyamide-based resin beads have an average mass per beads of 0.5 to 15 mg.

20. The production method of the polyamide-based resin expanded beads according to claim 17, wherein the blowing agent is carbon dioxide or nitrogen.

\* \* \* \* \*